United States Patent
Hosokawa

(10) Patent No.: US 12,256,051 B2
(45) Date of Patent: Mar. 18, 2025

(54) IMAGE PROCESSING APPARATUS AND METHOD FOR NATURAL REPRESENTATION OF LIGHT IN AN IMAGE

(71) Applicant: SONY GROUP CORPORATION, Tokyo (JP)

(72) Inventor: Kenichiro Hosokawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 29 days.

(21) Appl. No.: 17/995,344

(22) PCT Filed: Mar. 31, 2021

(86) PCT No.: PCT/JP2021/013766
§ 371 (c)(1),
(2) Date: Oct. 3, 2022

(87) PCT Pub. No.: WO2021/210399
PCT Pub. Date: Oct. 21, 2021

(65) Prior Publication Data
US 2023/0156170 A1    May 18, 2023

(30) Foreign Application Priority Data
Apr. 13, 2020 (JP) ................. 2020-071871

(51) Int. Cl.
*H04N 13/111* (2018.01)
*G06T 5/40* (2006.01)
(Continued)

(52) U.S. Cl.
CPC ............. *H04N 13/111* (2018.05); *G06T 5/40* (2013.01); *G06T 7/50* (2017.01); *G06V 10/60* (2022.01)

(58) Field of Classification Search
None
See application file for complete search history.

(56) References Cited

U.S. PATENT DOCUMENTS

2011/0102551 A1*  5/2011  Iwasaki ................... G06T 15/50
                                                         348/46
2012/0033038 A1    2/2012  Cho et al.
(Continued)

FOREIGN PATENT DOCUMENTS

JP    2005-310020 A    11/2005
JP    2008-004085 A    1/2008
(Continued)

OTHER PUBLICATIONS

International Search Report and Written Opinion of PCT Application No. PCT/JP2021/013766, issued on Jun. 29, 2021, 08 pages of ISRWO.
(Continued)

*Primary Examiner* — Talha M Nawaz
(74) *Attorney, Agent, or Firm* — CHIP LAW GROUP

(57) ABSTRACT

The present technology relates to an image processing apparatus and method and a program that enable natural representation of light in an image in accordance with a viewpoint. The image processing apparatus calculates information indicating a change in a light source region between an input image and a viewpoint-converted image that is obtained by performing viewpoint conversion on the input image on the basis of a specified viewpoint, and causes a change in representation of light in the viewpoint-converted image on the basis of the calculated information indicating a change in the light source region. The present technology can be applied to an image display system that generates a pseudo stereoscopic image with motion parallax from one image.

12 Claims, 14 Drawing Sheets

(51) Int. Cl.
  *G06T 7/50* (2017.01)
  *G06V 10/60* (2022.01)

(56) References Cited

U.S. PATENT DOCUMENTS

| | | | |
|---|---|---|---|
| 2013/0250070 A1* | 9/2013 | Takayama | H04N 23/90 348/47 |
| 2017/0078639 A1 | 3/2017 | Yu et al. | |
| 2021/0329217 A1* | 10/2021 | Blond | G06T 5/50 |

FOREIGN PATENT DOCUMENTS

| | | |
|---|---|---|
| JP | 2011-048545 A | 3/2011 |
| JP | 2012-160922 A | 8/2012 |
| JP | 2012-199736 A | 10/2012 |

OTHER PUBLICATIONS

Office Action for JP Patent Application No. 2022-515294, issued on Dec. 10, 2024, 03 pages of English Translation and 04 pages of Office Action.

\* cited by examiner

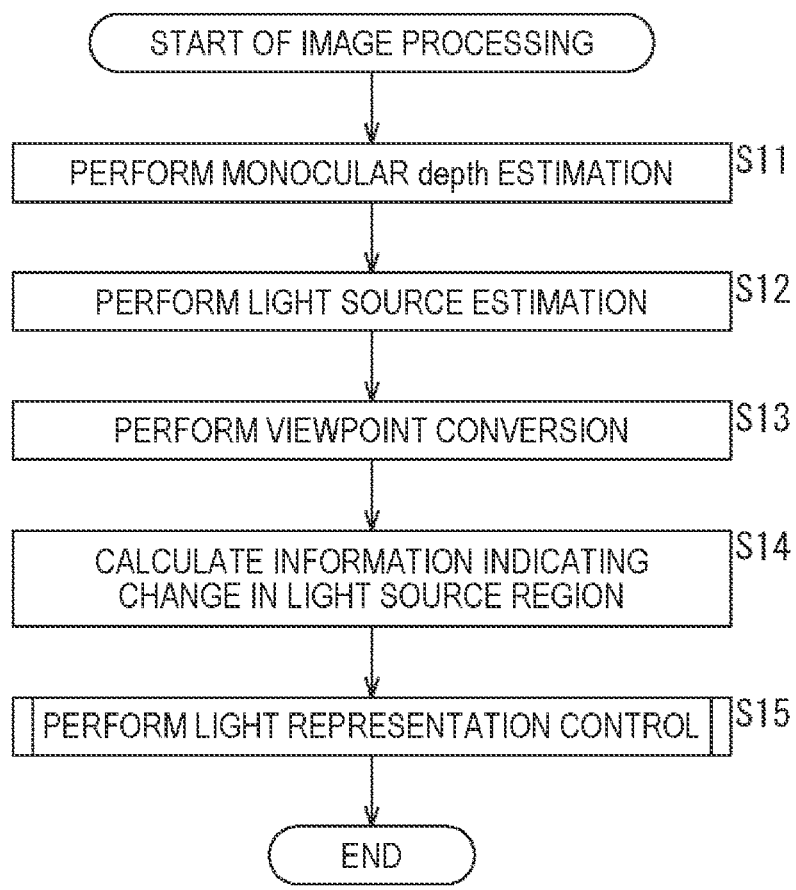
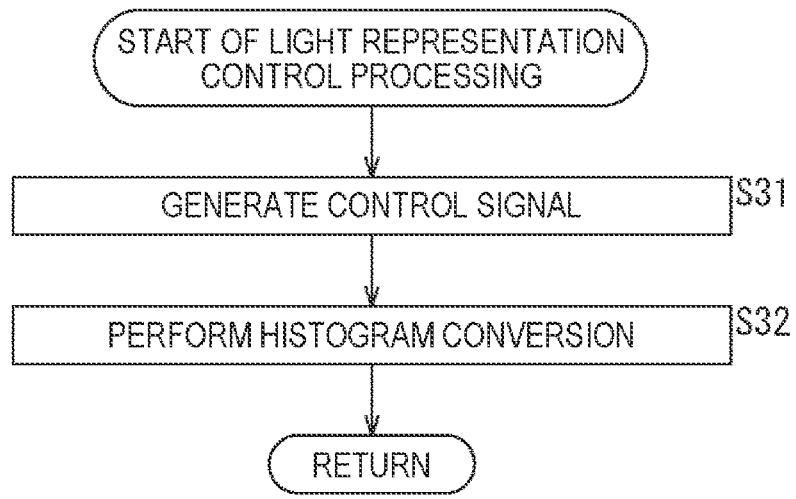

IMAGE PROCESSING APPARATUS AND METHOD FOR NATURAL REPRESENTATION OF LIGHT IN AN IMAGE

CROSS REFERENCE TO RELATED APPLICATIONS

This application is a U.S. National Phase of International Patent Application No. PCT/JP2021/013766 filed on Mar. 31, 2021, which claims priority benefit of Japanese Patent Application No. JP 2020-071871 filed in the Japan Patent Office on Apr. 13, 2020. Each of the above-referenced applications is hereby incorporated herein by reference in its entirety.

TECHNICAL FIELD

The present technology relates to an image processing apparatus and a method and a program, and more particularly to an image processing apparatus and method and a program capable of naturally representing light in an image in accordance with a viewpoint.

BACKGROUND ART

In a case of generating a pseudo stereoscopic image with motion parallax on the basis of a plurality of viewpoint images, representation of light in which an area of a light source region in the image changes in response to a change in a positional relationship between a light source and an object due to a change in a viewpoint is realized by interpolating adjacent viewpoint images (see, for example, Patent Document 1).

CITATION LIST

Patent Document

Patent Document 1: Japanese Patent Application Laid-Open No. 2005-310020

SUMMARY OF THE INVENTION

Problems to be Solved by the Invention

However, in the technology of Patent Document 1, the representation of light described above can be performed because the technology of Patent Document 1 is a technology in a virtual three-dimensional space on the premise of computer graphics (CG). That is, since the positional relationship between the light source and the object is known in the virtual three-dimensional space, the representation of light described above can be performed.

On the other hand, in a case of generating a pseudo stereoscopic image on the basis of one image captured in a real space, it has been difficult to perform the representation of light described above because the positional relationship between the light source and the object is unknown.

The present technology has been made in view of such a situation, and is to enable natural representation of light in an image in accordance with a viewpoint.

Solutions to Problems

An image processing apparatus according to one aspect of the present technology includes:

a light source change calculation unit configured to calculate information indicating a change in a light source region between an input image and a viewpoint-converted image that is obtained by performing viewpoint conversion on the input image on the basis of a specified viewpoint; and a light representation control unit configured to cause a change in representation of light in the viewpoint-converted image, on the basis of the information indicating a change in the light source region and calculated by the light source change calculation unit.

In one aspect of the present technology, information indicating a change in the light source region between the input image and the viewpoint-converted image that is obtained by performing viewpoint conversion on the input image on the basis of a specified viewpoint is calculated, and representation of light in the viewpoint-converted image is changed on the basis of the calculated information indicating a change in the light source region.

BRIEF DESCRIPTION OF DRAWINGS

FIG. 7 is a flowchart for explaining image processing of the camera-equipped TV device.

FIG. 8 is a flowchart for explaining light representation control processing in step S15 in FIG. 7.

MODE FOR CARRYING OUT THE INVENTION

Hereinafter, an embodiment for implementing the present technology will be described. The description will be given in the following order.

1. Outline of present technology
2. First embodiment (camera-equipped television (TV) device)
3. Second embodiment (light field display device)
4. Other

1. Outline of Present Technology (Configuration Example of Image Display System)

Figure 1:
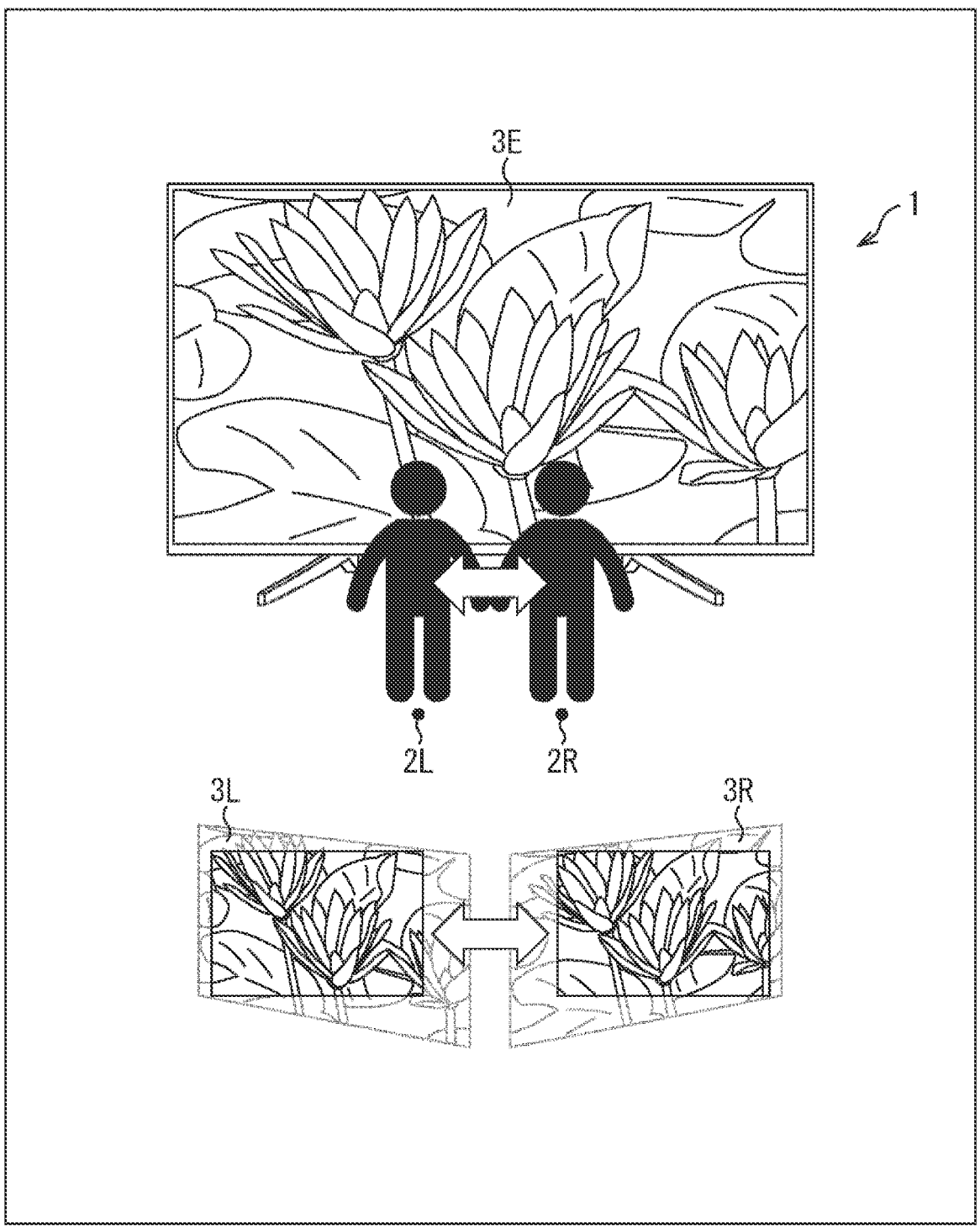
FIG. 1 is a view illustrating a configuration of an embodiment of an image display system to which the present technology is applied.

FIG. 1 is a view illustrating a configuration of an embodiment of an image display system to which the present technology is applied.

An image display system 1 in FIG. 1 is a system that generates and displays a pseudo stereoscopic image with motion parallax from one input image, on the basis of line-of-sight information. The pseudo stereoscopic image includes a plurality of viewpoint-converted images which is images obtained by performing a plurality of times of viewpoint conversion on the input image.

The image display system 1 includes, for example, a camera-equipped TV device capable of acquiring line-of-sight information of a viewer/listener, a light field display device that displays images for N viewpoints, and the like.

For example, an input image 3E in a case of viewing from a viewpoint at a central position toward a display is inputted to the image display system 1.

For example, the image display system 1 generates a viewpoint-converted image 3L or a viewpoint-converted image 3R from one input image 3E on the basis of the line-of-sight information at a position 2L or a position 2R for viewing. The image display system 1 displays the generated viewpoint-converted image 3L or viewpoint-converted image 3R on the display.

At that time, the image display system 1 estimates a light source region in the viewpoint-converted image 3L/3R, on the basis of the line-of-sight information at the position 2L or 2R for viewing and a region (hereinafter, referred to as a light source region) corresponding to a light source in the input image 3E. Then, the image display system 1 calculates information indicating a change in the light source region between the input image 3E and the viewpoint-converted image 3L/3R, to control representation of light.

Figure 2:
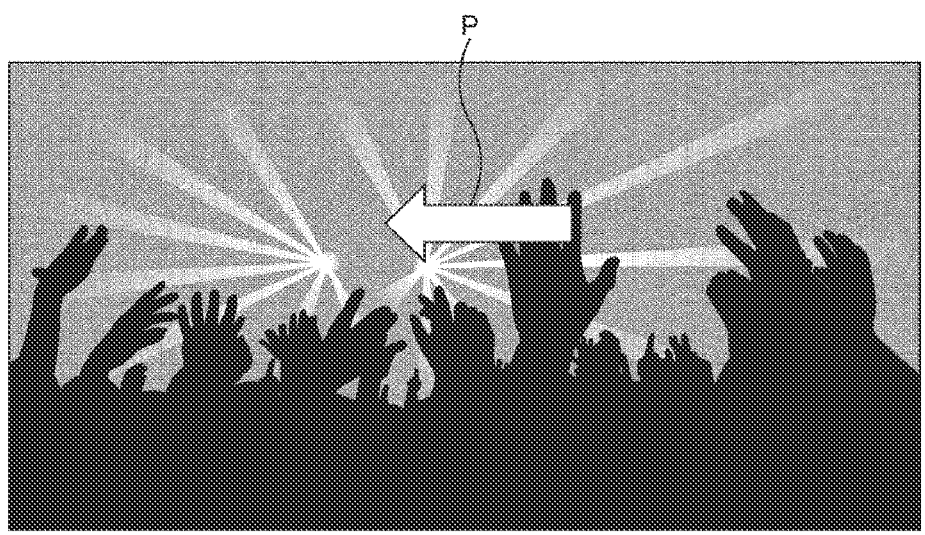
FIG. 2 is a view illustrating an example of an effect according to the present technology.

FIG. 2 is a view illustrating an example of an effect according to the present technology.

FIG. 2 illustrates, for example, an input image in which light is emitted from a light source on a stage on a depth side in the figure toward an audience on a front side in the figure. In the input image, since the stage is located on the depth side and the audience is located on the front side, the light source and the light emitted from the light source are visible and hidden in accordance with a position of a hand raised by the audience.

When a movement of a viewpoint of a user causes a movement of a hand in a direction indicated by an arrow in the input image in FIG. 2 to shield the "light source", a viewpoint-converted image is appropriately darkened by control of representation of light according to the present technology. On the contrary, when a movement of a hand causes the "light source" to appear, the viewpoint-converted image is appropriately brightened by the control of representation of light according to the present technology.

As described above, according to the present technology, light in an image can be naturally represented in accordance with a viewpoint. As a result, the viewer/listener can obtain a high realistic feeling.

2. First Embodiment (Camera-Equipped TV Device)

(Configuration Example of Camera-Equipped TV Device)

Figure 3:
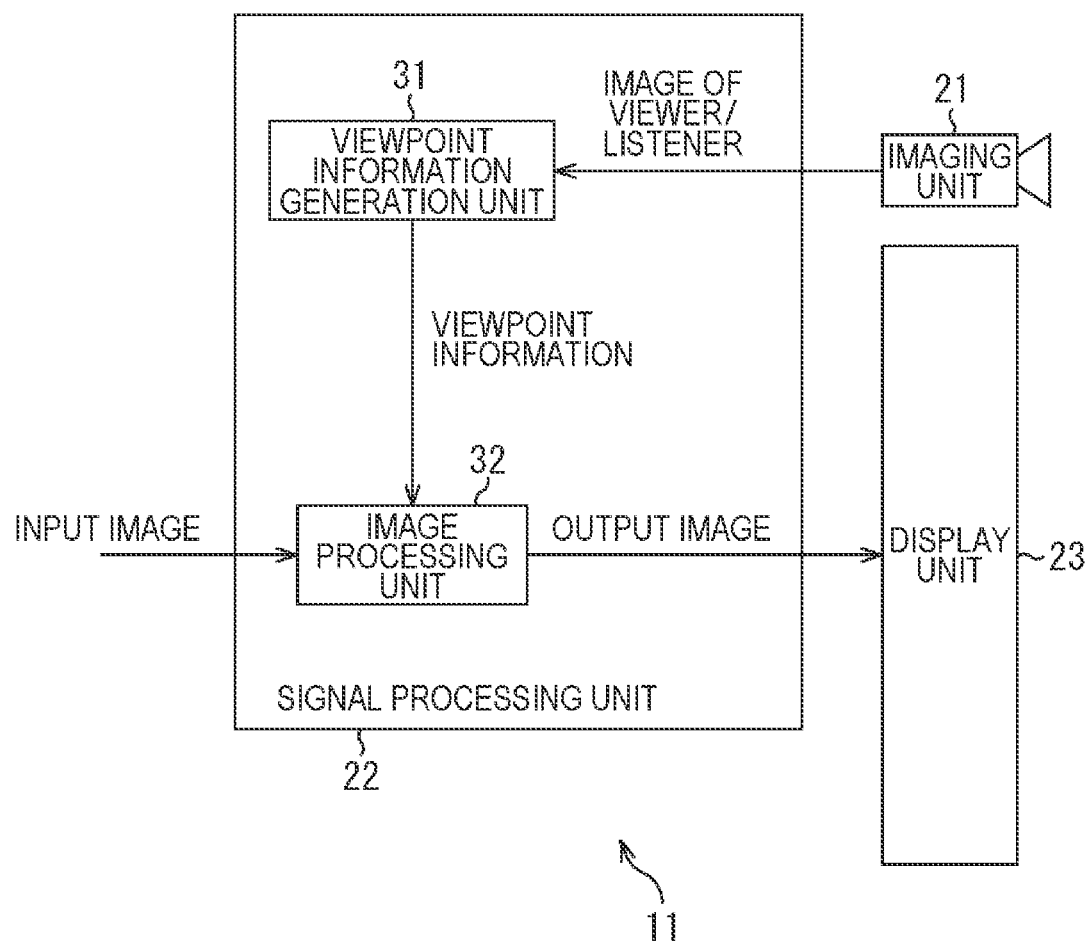
FIG. 3 is a block diagram illustrating a configuration of a camera-equipped TV device.

FIG. 3 is a block diagram illustrating a configuration of a camera-equipped TV device 11, which is a first embodiment of the image display system of the present technology.

The camera-equipped TV device 11 in FIG. 3 includes an imaging unit 21, a signal processing unit 22, and a display unit 23.

The imaging unit 21 is provided, for example, on an upper portion of the display unit 23 in order to capture an image of a viewer/listener. The imaging unit 21 is configured by a camera or the like having an image sensor such as a charge coupled device (CCD) or a complementary metal oxide semiconductor (CMOS). The imaging unit 21 outputs the captured image of the viewer/listener to the signal processing unit 22.

The signal processing unit 22 includes a viewpoint information generation unit 31 and an image processing unit 32.

The viewpoint information generation unit 31 generates viewpoint information of the viewer/listener on the basis of the image of the viewer/listener captured by the imaging unit 21. The viewpoint information generation unit 31 outputs the generated viewpoint information to the image processing unit 32.

On the basis of the viewpoint information supplied from the viewpoint information generation unit 31, the image processing unit 32 generates a viewpoint-converted image from an input image inputted from, for example, a tuner (not illustrated) or the like in a preceding stage. The image processing unit 32 outputs the generated viewpoint-converted image to the display unit 23. The input image is basically an image of one viewpoint, but a plurality of viewpoint images may be used.

At that time, the image processing unit 32 estimates a light source region of the input image, and generates information (hereinafter, viewpoint conversion light source region information) indicating a light source region of the viewpoint-converted image from information (hereinafter, referred to as input light source region information) indicating the light source region of the input image, on the basis of the viewpoint information supplied from the viewpoint information generation unit 31. The image processing unit 32 controls representation of light in the viewpoint-converted image, by calculating information indicating a change in the light source region between the input image and the viewpoint-converted image on the basis of the input light source region information and the viewpoint conversion light source information.

The display unit 23 is configured by a liquid crystal display (LCD), an organic EL (an organic light emitting diode: OLED), or the like. The display unit 23 displays an image supplied from the image processing unit 32.

<Configuration Example of Image Processing Unit>

Figure 4:
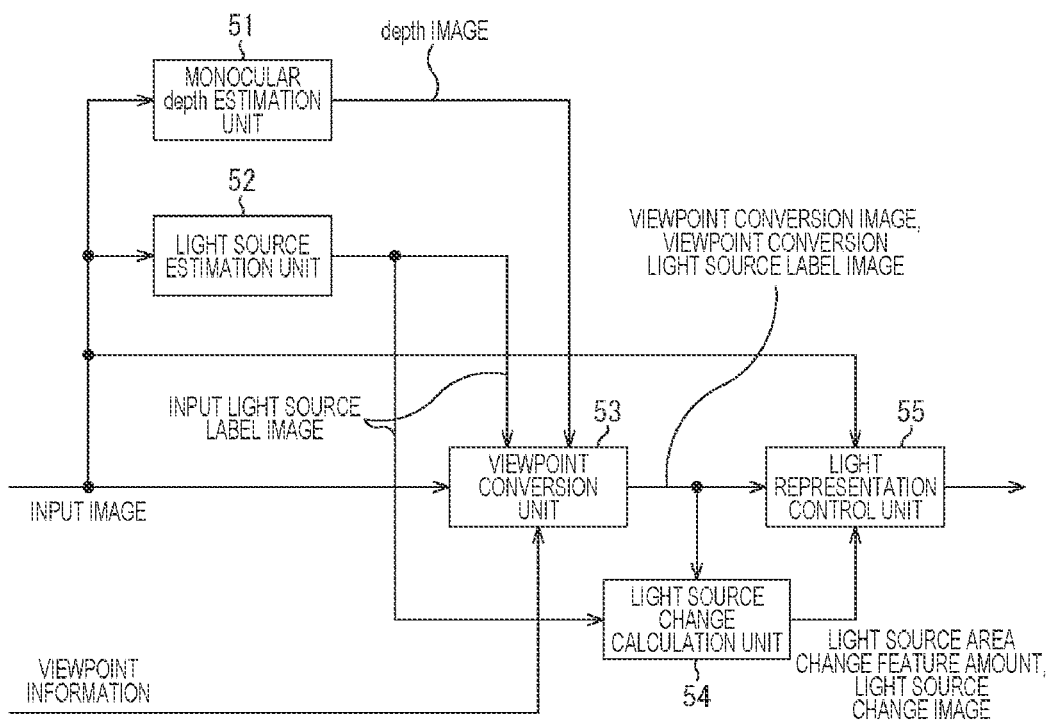
FIG. 4 is a block diagram illustrating a configuration example of an image processing unit.

FIG. 4 is a block diagram illustrating a configuration example of the image processing unit 32.

In FIG. 4, the image processing unit 32 includes a monocular depth estimation unit 51, a light source estimation unit 52, a viewpoint conversion unit 53, a light source change calculation unit 54, and a light representation control unit 55.

To the monocular depth estimation unit 51, the light source estimation unit 52, the viewpoint conversion unit 53, and the light representation control unit 55, the input image is inputted. Furthermore, the viewpoint information supplied from the viewpoint information generation unit 31 is inputted to the viewpoint conversion unit 53.

The monocular depth estimation unit 51 estimates a depth for each pixel on the basis of the input image. An estimation method for the depth is not limited. Examples of a typical estimation method for a monocular depth includes, for example, a high-speed deep neural network (DNN)-based monocular depth estimation method considering real-time processing, a monocular depth estimation method that enables depth learning from two-viewpoint images without teaching data by using machine learning, and the like. The monocular depth estimation unit 51 outputs the estimated depth of each pixel to the viewpoint conversion unit 53.

The light source estimation unit 52 estimates a light source region in the input image.

The light source is an object itself that emits light, and emitted light is not included in the light source. A method for estimating the light source region is not particularly limited. The method for estimating the light source region may be a model-based method or a DNN-based method.

The light source region estimated in the input image is labeled in an appropriate format. For example, each image is given with a label representing "probability of being a light source" in 0.0 to 1.0. Furthermore, for example, a label representing "whether or not to be a light source" is given in a binary manner with 0 or 1. Note that, when there is a plurality of light source regions, an ID may be assigned to each light source region, and a label may be given to each light source region.

The light source estimation unit 52 outputs an image in which a label is given in an appropriate format to the input image, to the viewpoint conversion unit 53 and the light source change calculation unit 54 as a light source label image, which is information indicating a light source region.

Note that, in the light source label image, since information of pixels to which no label is given is unnecessary, the light source label image may not have a general image format.

The viewpoint conversion unit 53 generates a viewpoint-converted image from the input image, on the basis of the viewpoint information supplied from the viewpoint information generation unit 31 and the depth estimated by the monocular depth estimation unit 51. The viewpoint-converted image is an image in which a subject in the input image is viewed from a viewpoint specified in the viewpoint information supplied from the viewpoint information generation unit 31.

A method of performing the viewpoint conversion is not limited. A method of performing the viewpoint conversion may be a model-based method or a DNN-based method. Furthermore, when the DNN-based method is used, viewpoint conversion may be performed using the light source label image of the input image as an input of the DNN.

Furthermore, on the basis of the viewpoint information supplied from the viewpoint information generation unit 31 and the depth estimated by the monocular depth estimation unit 51, the viewpoint conversion unit 53 generates a light source label image (hereinafter, referred to as a viewpoint conversion light source label image) indicating the light source region of the viewpoint-converted image, from a light source label image (hereinafter, referred to as an input light source label image) indicating the light source region of the input image supplied from the light source estimation unit 52.

The viewpoint-converted image and the viewpoint conversion light source label image generated by the viewpoint conversion unit 53 are outputted to the light source change calculation unit 54.

The light source change calculation unit 54 calculates information indicating a change in the light source region between the input image and the viewpoint-converted image, on the basis of the input light source label image supplied from the light source estimation unit 52 and the viewpoint conversion light source label image supplied from the viewpoint conversion unit 53. The light source change calculation unit 54 outputs the calculated information indicating a change in the light source region to the light representation control unit 55.

Specifically, the light source change calculation unit 54 calculates a light source area change feature amount representing a change in area of the light source region between the input image and the viewpoint-converted image, and outputs the light source area change feature amount to the light representation control unit 55. Furthermore, the light source change calculation unit 54 generates a light source change image representing a change in the light source region between the input image and the viewpoint-converted image, and outputs the light source change image to the light representation control unit 55.

On the basis of at least one of the light source area change feature amount or the light source change image supplied from the light source change calculation unit 54 and on the basis of the viewpoint conversion light source label image supplied from the viewpoint conversion unit 53, the light representation control unit 55 controls representation of light in the viewpoint-converted image. The viewpoint-converted image whose representation of light has been controlled by the light representation control unit 55 is outputted to the display unit 23.

Specifically, in the viewpoint-converted image, the light representation control unit 55 converts a histogram of "other than the light source region" in accordance with an increase or a decrease in area of the light source region, and brightens or darkens the region of the "other than the light source region". The histogram is a graph representing a distribution of luminance values of pixels in an image.

For example, if the area of the light source is reduced by shielding in the real world, a light amount of intraocular scattered light generated in a human eye is reduced, and the light amount is generally reduced and perceived. Therefore, when the area of the light source region in the image decreases, more natural representation of light is realized by darkening the region other than the light source region.

Furthermore, by using the light source change image, it is possible to more naturally represent a change in light accompanying a change in viewpoint. For example, when light rays are emitted radially from a light source, it is possible to perform light ray representation according to a change in shape of the light source, halo representation generated around a shielding object, and the like, by performing machine learning in advance on a correspondence among the radial light, the shielding object, and the light source.

Next, light source change calculation processing will be described.

(Details of Light Source Change Calculation Processing)

Figure 5:
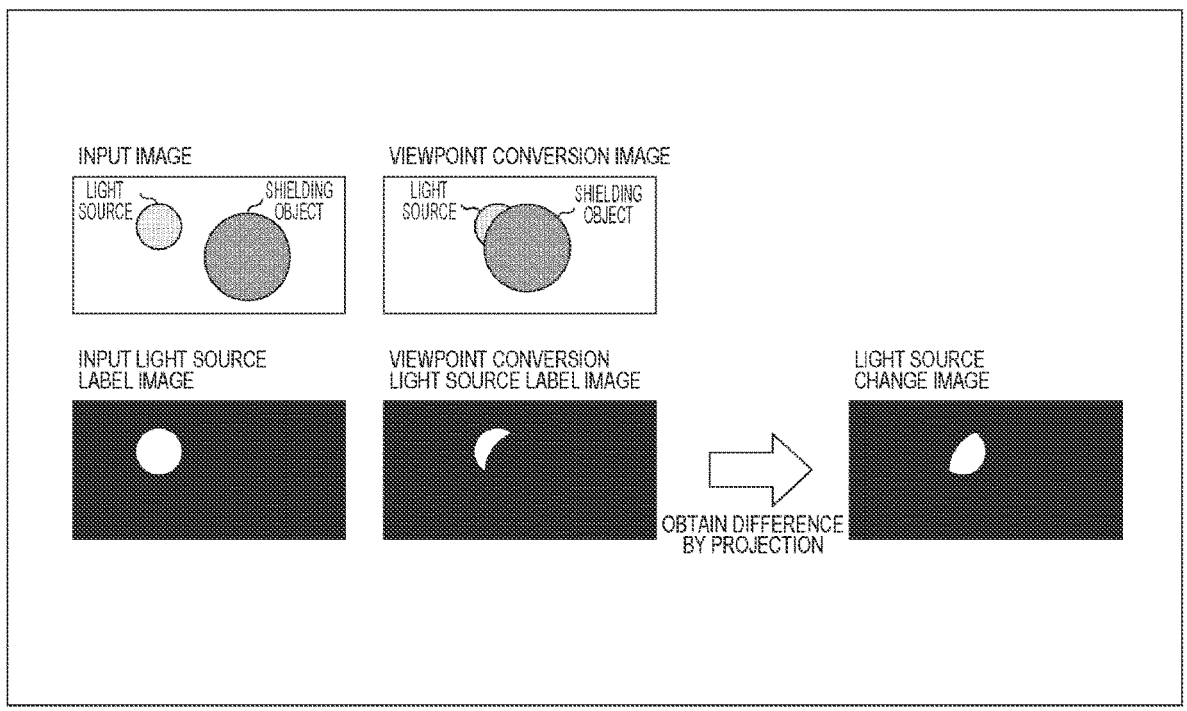
FIG. 5 is a view illustrating an example of an image to be used for light source change calculation processing.

FIG. 5 is a view illustrating an example of an image to be used for the light source change calculation processing.

In FIG. 5, from the left, an input image and an input light source label image are illustrated, and a viewpoint-converted image and a viewpoint conversion light source label image are illustrated.

In the input image, on a right side of a light source, a shielding object exists at a position away from the light source. In the viewpoint-converted image, the shielding object overlaps with the light source, and shields a part of the light source.

A type of necessary information indicating a change in the light source region varies depending on how to control representation of light in the light representation control unit 55 to be described later. For example, the information indicating a change in the light source region includes the light source area change feature amount, the light source change image, and the like described above. Here, details of the light source area change feature amount and the light source change image will be described.

(Light Source Area Change Feature Amount)

The light source change calculation unit 54 obtains an integrated value of pixel values in the entire image region of the light source label image, and outputs, as the light source area change feature amount, a difference $L_{diff}$, a ratio $L_{rate}$, and the like of the integrated values before and after viewpoint conversion, to the light representation control unit 55. $L_{diff}$ is represented by the following Equation (1). $L_{rate}$ is represented by the following Equation (2).

[Math. 1]
$$L = \sum_i f(x_i) \cdot I_i \quad (1)$$
$$L' = \sum_i f(x'_i) \cdot I'_i$$
$$L_{diff} = L' - L$$

Hadamard division (2)

(division for each element of matrix)

$$L_{rate} = L' \oslash L$$

Here, L is the light source area feature amount of the input image, and L' is the light source area feature amount of the viewpoint-converted image.

$x_i$ represents a pixel value vector at a position i of the input image. The pixel value vector is a set of RGB pixel values. $L_i$ represents a value at a position i of the input light source label image. $x'_i$ represents a pixel value vector at a position i of the viewpoint-converted image. $L'_i$ represents a value at a position i of the viewpoint conversion light source label image. f(·) represents any function for setting a weight by a pixel value.

Here, when a dimension of x (for example, three-dimensional in a case of RGB) is degenerated to a one-dimensional weight such as a luminance by f(·), L also becomes one-dimensional and becomes a scalar value. When the dimension of x is not degenerated to a one-dimensional weight such as a luminance by f(·), L is the number of dimensions of x.

Note that an example of the definition of $L_{diff}$ is shown as Equation (1), and an example of the definition of $L_{rate}$ is shown as Equation (2). However, in particular, when x is represented as a vector, it is necessary to adopt an appropriate definition depending on what color space is handled.

In Equations (1) and (2), a three-dimensional RGB space is assumed, but the information indicating a change in the light source region is only required to be a quantitative index having a meaning such as "difference" or "ratio" with respect to an increase or a decrease in the light source area. Furthermore, other than outputting Equation (1) or Equation (2) as the light source area change feature amount, for example, a pair of L and L' may be outputted as the light source area change feature amount.

Furthermore, for obtaining an integrated value in L and L', for example, the integrated value may be obtained by weighting a luminance or the like with intensity of the light source.

(Light Source Change Image)

The light source change calculation unit 54 aligns the input light source label image with the viewpoint conversion light source label image, performs projection, and obtains a difference. As a result, a light source change image representing a change (an increase or a decrease) in the light source region is generated as indicated by an arrow in FIG. 5.

Note that, when there is a plurality of light source regions, an ID may be assigned to each light source region, and the light source area change feature amount, the light source change image, and the like may be obtained for each light source region.

(Configuration Example of Light Representation Control Unit)

Figure 6:
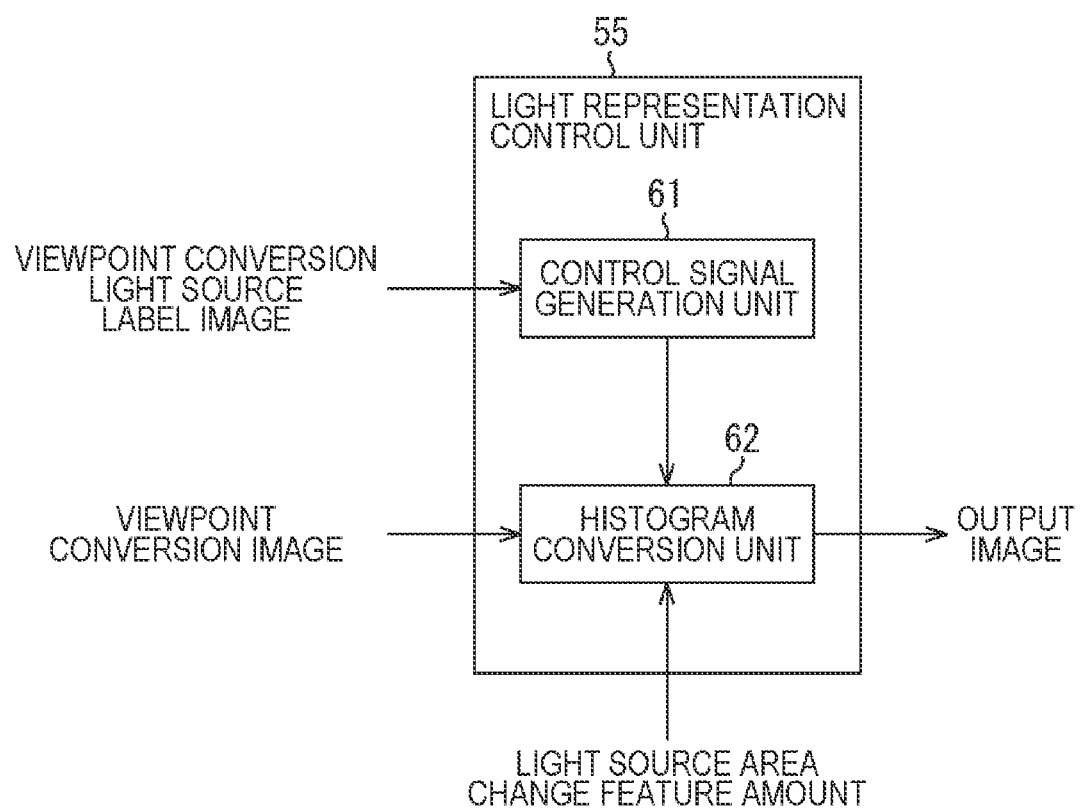
FIG. 6 is a block diagram illustrating a configuration example of a light representation control unit.

FIG. 6 is a block diagram illustrating a configuration example of a light representation control unit.

In FIG. 6, the light representation control unit 55 includes a control signal generation unit 61 and a histogram conversion unit 62.

Here, intraocular scattered light generated in a human eye increases or decreases in accordance with an increase or a decrease in shielded region of the light source. However, intensity itself of light of the light source does not change. Since the light source usually has sufficiently high light intensity with respect to scattered light, light in the image can be more naturally represented by not performing histogram conversion on the light source region.

Therefore, the control signal generation unit 61 generates a control signal such as a mask signal in order to exclude the light source region from the histogram conversion, on the basis of the viewpoint conversion light source label image. The control signal generation unit 61 outputs the generated control signal to the histogram conversion unit 62. Note that the histogram conversion is processing of converting a histogram, which is a graph representing a distribution of luminance values.

The histogram conversion unit 62 performs the histogram conversion on the viewpoint-converted image in accordance with the light source area change feature amount supplied from the light source change calculation unit 54, on the basis of the control signal supplied from the control signal generation unit 61.

The histogram conversion is performed by a general method such as using a tone curve or gamma conversion. The histogram conversion unit 62 performs the histogram conversion by causing a change in a tone curve of the viewpoint-converted image in accordance with the light source area change feature amount, and outputs the viewpoint-converted image as an output image.

Here, when the light source area change feature amount has a color (that is, vector representation of three dimension or the like is performed), the histogram conversion unit 62 causes a change in the tone curve in accordance with the color. Furthermore, when there is a plurality of light source regions, the histogram conversion unit 62 causes a change in the tone curve in consideration of which light source region has a changed shielded region.

Note that, a description has been given to an example in which the histogram conversion is performed in the light representation control unit 55. However, the light representation method is not limited to the histogram conversion, and for example, more advanced image conversion processing such as removing or adding intraocular scattered light generated in a human eye may be performed. In this case, the light in the image can be more naturally represented.

(Operation of Camera-Equipped TV Device)

FIG. 7 is a flowchart for explaining image processing of the image processing unit 32.

In step S11, the monocular depth estimation unit 51 performs monocular depth estimation. Specifically, the monocular depth estimation unit 51 estimates a depth for each pixel on the basis of the input image. The monocular depth estimation unit 51 outputs the estimated depth of each pixel to the viewpoint conversion unit 53.

In step S12, the light source estimation unit 52 performs light source estimation in the input image. The light source estimation unit 52 generates an input light source label image by giving a label in an appropriate format to a light source region estimated as a light source, and outputs the input light source label image to the viewpoint conversion unit 53 and the light source change calculation unit 54.

In step S13, the viewpoint conversion unit 53 performs viewpoint conversion. Specifically, on the basis of the viewpoint information supplied from the viewpoint information generation unit 31 and the depth estimated by the monocular depth estimation unit 51, the viewpoint conversion unit 53 generates a viewpoint-converted image from the input image. Furthermore, on the basis of the viewpoint information supplied from the viewpoint information generation unit 31 and the depth estimated by the monocular depth estimation unit 51, the viewpoint conversion unit 53 generates a viewpoint conversion light source label image from the input light source label image supplied from the light source estimation unit 52.

In step S14, the light source change calculation unit 54 calculates information indicating a change in the light source region. Specifically, the light source change calculation unit 54 calculates information indicating a change in the light source region between the input image and the viewpoint-converted image, on the basis of the input light source label image supplied from the light source estimation unit 52 and the viewpoint conversion light source label image supplied from the viewpoint conversion unit 53.

In step S15, the light representation control unit 55 performs light representation control, on the basis of the information indicating a change in the light source region and calculated by the light source change calculation unit 54. Details of the light representation control will be described later with reference to FIG. 8. In step S15, representation of light in the viewpoint-converted image is controlled, and light is represented more naturally.

After step S15, the viewpoint-converted image whose representation of light has been controlled is outputted to the display unit 23 as an output image. The display unit 23 displays the viewpoint-converted image.

(Light Representation Control Processing)

FIG. 8 is a flowchart for explaining light representation control processing in step S15 in FIG. 7.

In step S31, the control signal generation unit 61 generates a control signal such as a mask signal on the basis of the viewpoint conversion light source label image. The control signal generation unit 61 outputs the generated control signal to the histogram conversion unit 62.

In step S32, on the basis of the control signal supplied from the control signal generation unit 61, the histogram conversion unit 62 performs the histogram conversion on the viewpoint-converted image in accordance with the light source area change feature amount supplied from the light source change calculation unit 54, and outputs the viewpoint-converted image as an output image. For example, the histogram conversion unit 62 causes a change in a tone curve of the viewpoint-converted image in accordance with the light source area change feature amount.

As described above, representation of light in the viewpoint-converted image is controlled, and the viewpoint-converted image is displayed in which a change in light accompanying a change in viewpoint is more naturally represented.

(Another Example of Light Representation Control)

Figure 9:
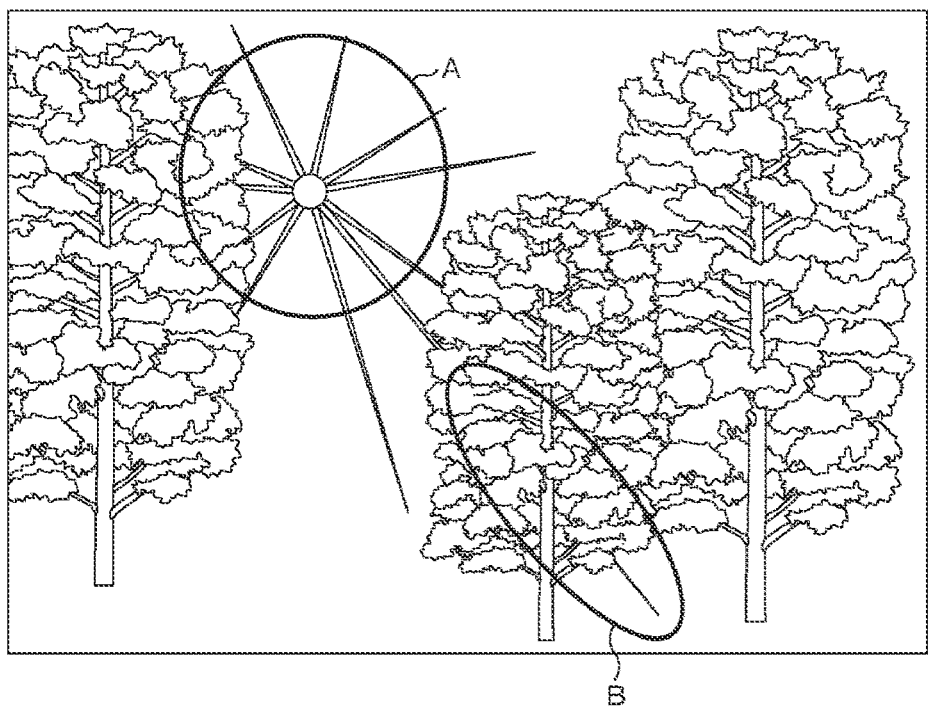
FIG. 9 is a view illustrating another example of the light representation control.

With reference to FIG. 9, another example of the light representation control will be described.

FIG. 9 illustrates, for example, an input image in which radial light rays from the sun as a light source are poured from gaps of trees. This light ray is called a light striation or a beam of light.

FIG. 9 illustrates a region A and a region B. The region A is a region where radial light rays are emitted from the light source. The region A is a region where it is estimated that there are many changes in light due to viewpoint conversion. The region B is a region where it is estimated that there are less changes in light due to viewpoint conversion.

As described above, when light rays are radially emitted from the light source in the input image, the light representation control unit 55 performs machine learning on a correspondence among a radial light, a shielding object, and the light source by using the light source change image. As a result, at a time of executing the light representation control, the light representation control unit 55 can appropriately represent a light ray (a light striation and/or a beam of light) when a shape of the light source changes.

(Configuration Example of Light Representation Control Unit at Time of Learning)

Figure 10:
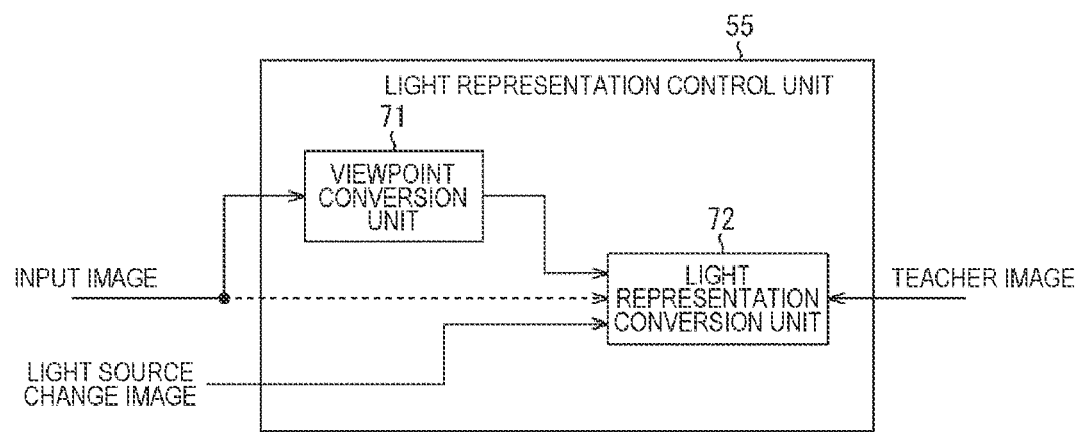
FIG. 10 is a block diagram illustrating a configuration example of the light representation control unit at a time of learning.

FIG. 10 is a block diagram illustrating a configuration example of a light representation control unit at a time of learning described above. Note that the light representation control unit at the time of learning is implemented by being developed in a random access memory (RAM) or the like by a central processing unit (CPU) of a personal computer or the like, for example.

The light representation control unit 55 in FIG. 10 includes a viewpoint conversion unit 71 and a light representation conversion unit 72.

The viewpoint conversion unit 71 performs viewpoint conversion on the input image by the method used in the viewpoint conversion unit 53 in FIG. 4, and outputs the viewpoint-converted image to the light representation conversion unit 72.

For learning by the light representation conversion unit 72, a plurality of viewpoint images obtained using a light field technology or the like is prepared. The viewpoint image may be created by CG or the like.

In the light representation conversion unit 72, one viewpoint image is set as a student image, and a viewpoint image (viewed from a viewpoint of a viewpoint conversion destination of the student image) corresponding to a viewpoint of a viewpoint conversion destination of the student image is set as a teacher image. Note that a learning set is an image group of a pair of the teacher image and the student image. It is desirable that the learning set contains a large amount of images accompanied by a change in area of the light source at the time of viewpoint conversion from the student image to the teacher image.

By using, as the student image, the viewpoint-converted image supplied from the viewpoint conversion unit 71 and the light source change image supplied from the light source change calculation unit 54, the light representation conversion unit 72 uses machine learning such as DNN to learn which conversion is performed to approach the teacher image.

At the time of this learning, without giving the input image itself to the light representation conversion unit 72, it is possible to specify how the light source has changed due to the viewpoint conversion by the light source change image. As a result, it is possible to learn how to cause a change in representation of light in association with a change in the light source.

Note that, when the input image before the viewpoint conversion is added to the student image, the light representation conversion unit 72 can learn a conversion method while further considering "how conversion is performed by the viewpoint conversion unit 71".

Furthermore, since the learning processing described above is performed by switching the teacher image among the plurality of viewpoints, a light ray (a light striation and/or a beam of light) changes in accordance with a shape change of the light source region in the viewpoint-converted image, so that it is expected to learn a change of the light ray.

(Configuration Example of Light Representation Control Unit at Time of Executing)

Figure 11:
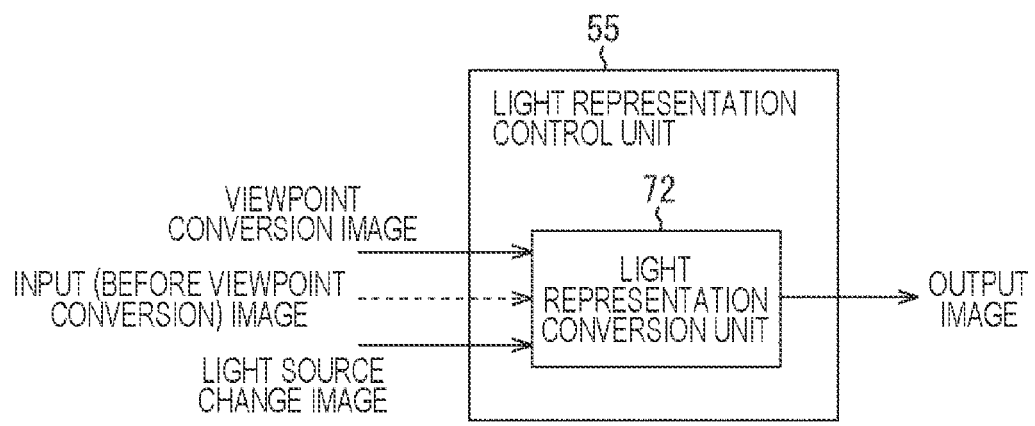
FIG. 11 is a block diagram illustrating a configuration example of the light representation control unit at a time of executing.

FIG. 11 is a block diagram illustrating a configuration example of a light representation control unit when the light representation control is executed after learning.

In FIG. 11, the light representation control unit 55 includes the light representation conversion unit 72 in FIG. 10.

The input image, the viewpoint-converted image supplied from the viewpoint conversion unit 53, and the light source change image supplied from the light source change calculation unit 54 are inputted to the light representation conversion unit 72. Note that, as described above, the input image is used to further consider "how conversion is performed by the viewpoint conversion unit 53 in the preceding stage" at the time of learning, and is not necessarily essential.

The light representation conversion unit 72 causes a change in a light ray (a light striation and/or a beam of light) in the viewpoint-converted image on the basis of the light source change image and the learned correspondence among the radial light, the shielding object, and the light source, and outputs the viewpoint-converted image as an output image.

(Another Example of Light Representation Control Processing)

Figure 12:
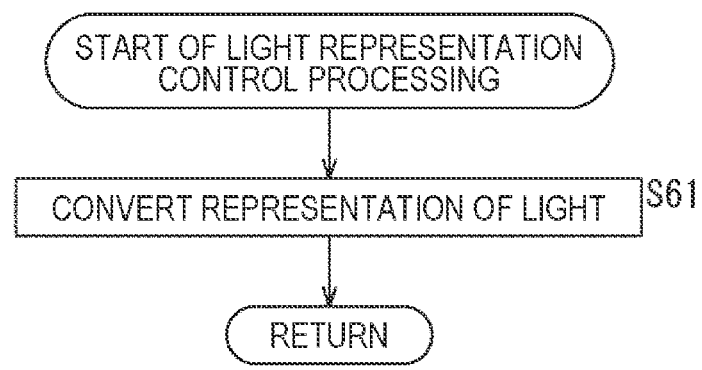
FIG. 12 is a flowchart for explaining another example of the light representation control processing.

FIG. 12 is a flowchart for explaining another example of the light representation control processing in step S15 of FIG. 7.

In step S61, the light representation conversion unit 72 converts representation of light in the viewpoint-converted image. Specifically, the light representation conversion unit 72 causes a change in a light ray (a light striation and/or a beam of light) in the viewpoint-converted image on the basis of the light source change image and the learned correspondence among the radial light, the shielding object, and the light source, and outputs the viewpoint-converted image as an output image.

As described above, representation of a light ray in the viewpoint-converted image is controlled, and the viewpoint-converted image is displayed in which a change in light accompanying a change in viewpoint is more naturally represented.

(Another Configuration Example of Light Representation Control Unit)

Figure 13:
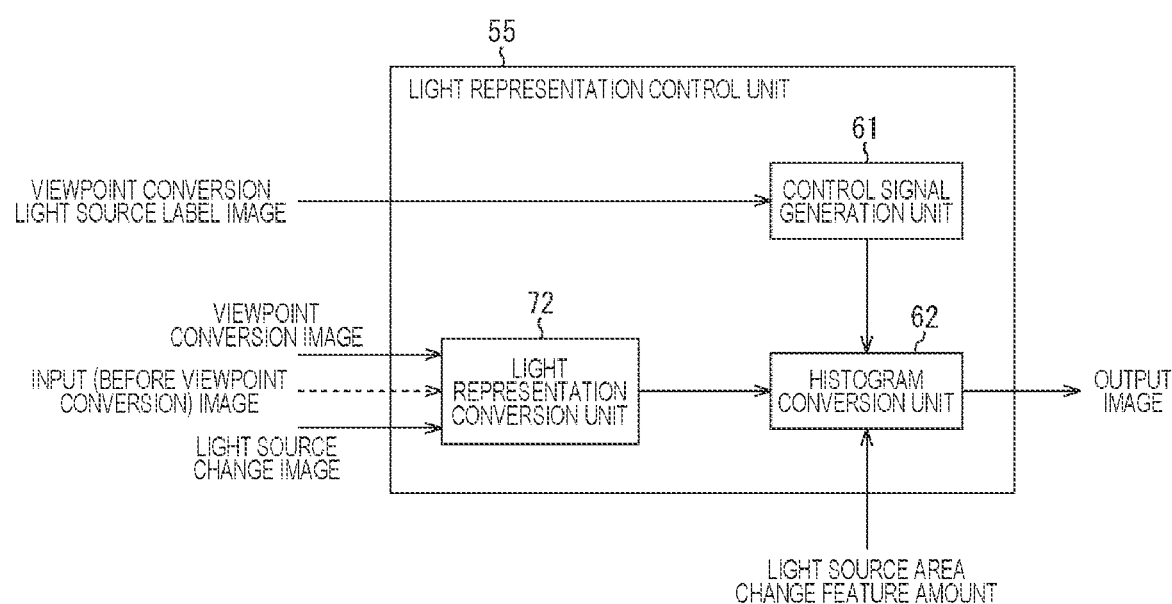
FIG. 13 is a block diagram illustrating another configuration example of the light representation control unit.

FIG. 13 is a block diagram illustrating another configuration example of the light representation control unit.

In FIG. 13, the light representation control unit 55 is configured by combining individual units of the light representation control unit 55 in FIGS. 6 and 11.

That is, the light representation control unit 55 includes the light representation conversion unit 72 in FIG. 11, the control signal generation unit 61 in FIG. 6, and the histogram conversion unit 62 in FIG. 6.

The light representation conversion unit 72 uses the viewpoint-converted image supplied from the viewpoint conversion unit 53, the light source change image supplied from the light source change calculation unit 54, and the learned correspondence among the radial light, the shielding object, and the light source, to cause a change in a light ray (a light striation and/or a beam of light) in the viewpoint-converted image to convert representation of light. The light representation conversion unit 72 outputs the viewpoint-converted image that is obtained by converting representation of light, to the histogram conversion unit 62.

On the basis of the viewpoint conversion light source label image corresponding to the viewpoint-converted image supplied to the light representation conversion unit 72, the control signal generation unit 61 generates a control signal such as a mask signal in order to exclude the light source region from the histogram conversion. The control signal generation unit 61 outputs the generated control signal to the histogram conversion unit 62.

On the basis of the control signal supplied from the control signal generation unit 61, the histogram conversion unit 62 performs the histogram conversion on the viewpoint-converted image whose representation of light has been converted by the light representation conversion unit 72 in accordance with the light source area change feature amount supplied from the light source change calculation unit 54, and outputs the viewpoint-converted image as an output image.

(Another Example of Light Representation Control Processing)

Figure 14:
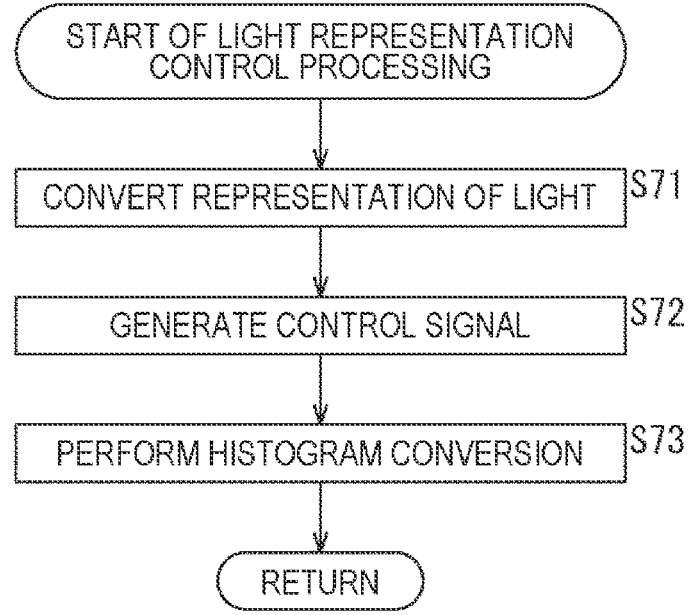
FIG. 14 is a flowchart for explaining another example of the light representation control processing.

FIG. 14 is a flowchart for explaining another example of the light representation control processing in step S15 of FIG. 7.

In step S71, the light representation conversion unit 72 converts representation of light in the viewpoint-converted image, similarly to the processing in step S61 in FIG. 12.

In step S72, on the basis of the viewpoint conversion light source label image corresponding to the viewpoint-converted image supplied to the light representation conversion unit 72, the control signal generation unit 61 generates a control signal such as a mask signal. The control signal generation unit 61 outputs the generated control signal to the histogram conversion unit 62.

In step S73, on the basis of the control signal supplied from the control signal generation unit 61, the histogram conversion unit 62 performs the histogram conversion on the viewpoint-converted image whose representation of light has been converted by the light representation conversion unit 72, in accordance with the light source area change feature amount supplied from the light source change calculation unit 54. The viewpoint-converted image subjected to the histogram conversion is outputted as an output image.

As described above, representation of a light ray in the viewpoint-converted image is converted, brightness of light is controlled, and the viewpoint-converted image is displayed in which a change in light accompanying a change in viewpoint is more naturally represented.

Note that the conversion of representation of light described above in step S71 of FIG. 14 may be performed after the histogram conversion.

3. Second Embodiment (Light Field Display Device)

(Configuration Example of Light Field Display Device)

Figure 15:
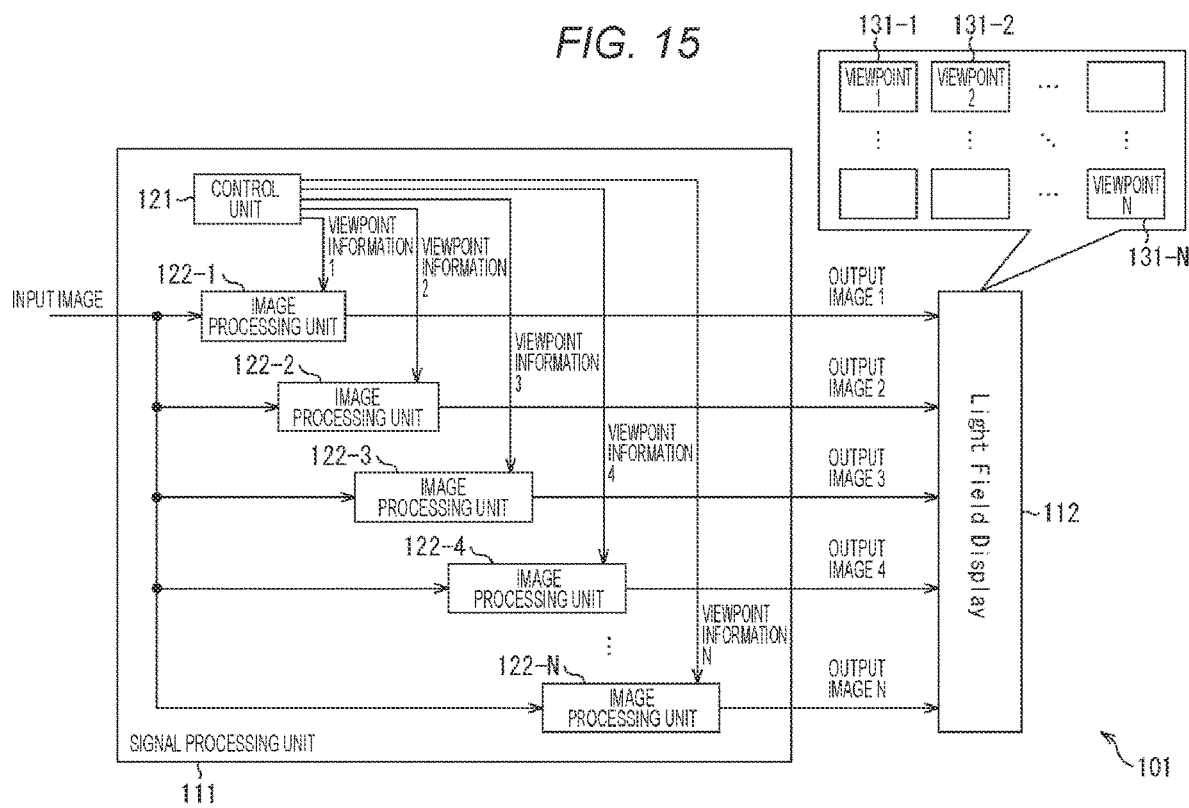
FIG. 15 is a block diagram illustrating a configuration of a light field display device.

FIG. 15 is a block diagram illustrating a configuration of a light field display device, which is a second embodiment of an image display system of the present technology.

A light field display device 101 in FIG. 15 generates viewpoint-converted images for N viewpoints from an input image, and displays the generated viewpoint-converted images for the N viewpoints.

The light field display device 101 includes a signal processing unit 111 and a light field display 112.

The signal processing unit 111 includes a control unit 121 and image processing units 122-1 to 122-N.

The control unit 121 outputs viewpoint information 1 to N to the image processing units 122-1 to 122-N. Individual pieces of the viewpoint information 1 to N correspond to viewpoint-converted images for N viewpoints outputted from the light field display 112. The viewpoint information 1 to N is fixed for every light field display device.

The image processing units 122-1 to 122-N are configured similarly to the image processing unit 32 in FIG. 3. The image processing units 122-1 to 122-N generate viewpoint-converted images from an input image supplied from a tuner (not illustrated) or the like in a preceding stage, for example, on the basis of each piece of the viewpoint information 1 to N supplied from the control unit 121. The image processing units 122-1 to 122-N output the generated viewpoint-converted image to the light field display 112.

At that time, similarly to the image processing unit 32, the image processing units 122-1 to 122-N convert the input image into a viewpoint-converted image and control representation of light of the viewpoint-converted image.

The light field display 112 is configured by an LCD, an organic EL, or the like. The light field display 112 includes display regions 131-1 to 131-N that display the viewpoint-converted images of viewpoints 1 to N. The light field display 112 displays the viewpoint-converted images of the viewpoints 1 to N supplied from the image processing units 122-1 to 122-N in the corresponding display regions 131-1 to 131-N as output images 1 to N.

Note that an operation of the image processing units 122-1 to 122-N in the light field display device 101 is the same operation as the operation of the image processing unit 32 in FIG. 3 described above with reference to FIG. 7, and thus the description thereof will be omitted.

4. Other (Effect)

As described above, in the present technology, information indicating a change in the light source region between the input image and the viewpoint-converted image that is obtained by performing viewpoint conversion on the input image on the basis of a specified viewpoint is calculated, and representation of light in the viewpoint-converted image is changed on the basis of the calculated information indicating the change in the light source region.

Therefore, according to the present technology, when an area of a light source occupied in an image changes as a result of viewpoint conversion, light in the image can be naturally represented in accordance with the viewpoint.

(Configuration Example of Computer)

The series of processing described above can be executed by hardware or software. In a case of executing the series of processes by software, a program that forms the software is installed from a program recording medium to a computer incorporated in dedicated hardware, a general-purpose personal computer, or the like.

Figure 16:
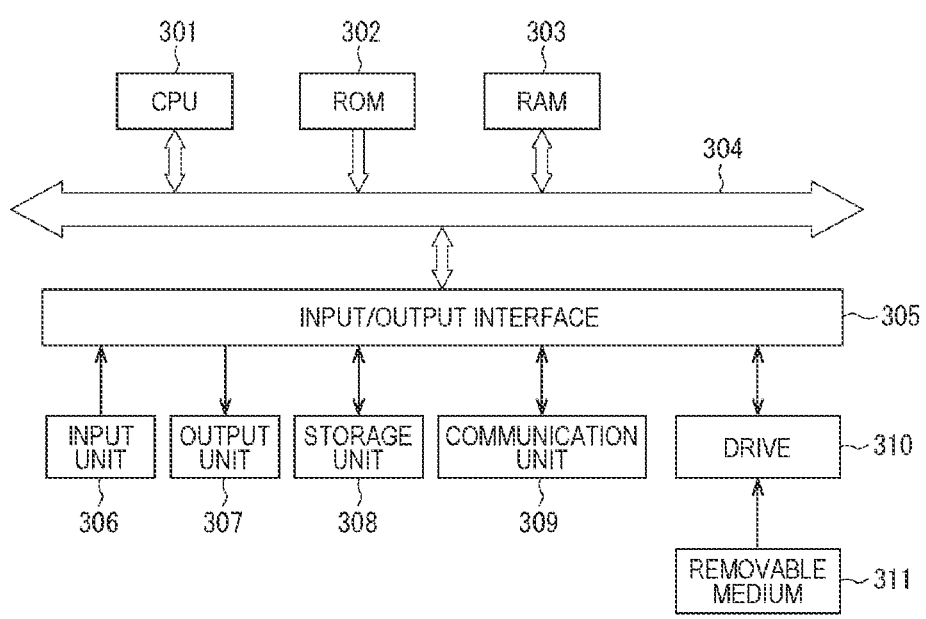
FIG. 16 is a block diagram illustrating a configuration example of a computer.

FIG. 16 is a block diagram illustrating a configuration example of hardware of a computer that executes the series of processes described above in accordance with a program.

A CPU 301, a read only memory (ROM) 302, and a RAM 303 are mutually connected by a bus 304.

The bus 304 is further connected with an input/output interface 305. The input/output interface 305 is connected with an input unit 306 including a keyboard, a mouse, and the like, and an output unit 307 including a display, a speaker, and the like. Furthermore, the input/output interface 305 is connected with a storage unit 308 including a hard disk, a non-volatile memory, and the like, a communication unit 309 including a network interface and the like, and a drive 310 that drives a removable medium 311.

In the computer configured as described above, the series of processes described above are performed, for example, by the CPU 301 loading a program recorded in the storage unit 308 into the RAM 303 via the input/output interface 305 and the bus 304, and executing.

The program to be executed by the CPU 301 is provided, for example, by being recorded on the removable medium 311 or via wired or wireless transfer media such as a local area network, the Internet, and digital broadcasting, to be installed in the storage unit 308.

Note that the program executed by the computer may be a program that performs processing in time series according to an order described in this specification, or may be a program that performs processing in parallel or at necessary timing such as when a call is made.

Note that, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

Furthermore, the effects described in this specification are merely examples and are not limited, and other effects may also be present.

The embodiments of the present technology are not limited to the above-described embodiments, and various modifications can be made without departing from the scope of the present technology.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, when one step includes a plurality of processes, the plurality of processes included in the one step can be executed by one device, and also shared and executed by a plurality of devices.

<Combination Example of Configuration>

The present technology can also have the following configurations.

(1)

An image processing apparatus including:
- a light source change calculation unit configured to calculate information indicating a change in a light source region between an input image and a viewpoint-converted image that is obtained by performing viewpoint conversion on the input image on the basis of a specified viewpoint; and
- a light representation control unit configured to cause a change in representation of light in the viewpoint-converted image, on the basis of the information indicating a change in the light source region and calculated by the light source change calculation unit.

(2)

The image processing apparatus according to (1), further including
- a viewpoint conversion unit configured to generate the viewpoint-converted image on the basis of the specified viewpoint.

(3)

The image processing apparatus according to (2), further including
- a light source estimation unit configured to estimate the light source region in the input image and generate input light source region information indicating the light source region in the input image, in which
- the viewpoint conversion unit generates viewpoint conversion light source region information indicating the light source region in the viewpoint-converted image, and
- the light source change calculation unit calculates information indicating a change in the light source region on the basis of the input light source region information and the viewpoint conversion light source region information.

(4)

The image processing apparatus according to (3), in which
- the light source change calculation unit calculates a light source area change feature amount indicating a change in area of the light source region, on the basis of the input light source region information and the viewpoint conversion light source region information, and
- the light representation control unit causes a change in representation of light in the viewpoint-converted image, on the basis of the light source area change feature amount calculated by the light source change calculation unit and the viewpoint conversion light source region information.

(5)

The image processing apparatus according to (4), in which
- the light representation control unit causes a change in a histogram of a region other than the light source region of the viewpoint-converted image, on the basis of a change in area of the light source region.

(6)

The image processing apparatus according to (3), in which
- the light source change calculation unit generates a light source change image indicating a change in shape of the light source region in an image, on the basis of the input light source region information and the viewpoint conversion light source region information, and the light representation control unit causes a change in representation of light in the viewpoint-converted image on the basis of the light source change image generated by the light source change calculation unit.

(7)

The image processing apparatus according to (6), in which
- the light representation control unit causes a change in representation of light in the viewpoint-converted image on the basis of the light source change image generated by the light source change calculation unit and the input image.

(8)

The image processing apparatus according to (6), in which
- the light representation control unit causes a change in a light striation and a beam of light in the viewpoint-converted image, on the basis of the light source change image generated by the light source change calculation unit.

(9)

The image processing apparatus according to (3), in which
- the light source estimation unit generates the input light source region information by giving the input image a label indicating the estimated light source region.

(10)

The image processing apparatus according to (3), further including
- a depth estimation unit configured to estimate a depth of a pixel constituting the input image, in which
- the viewpoint conversion unit generates the viewpoint-converted image and the viewpoint conversion light source region information on the basis of the depth estimated by the depth estimation unit.

(11)

The image processing apparatus according to any one of (1) to (10), in which
- the input image is one image.

(12)

An image processing method including,
- by an image processing apparatus,
- calculating information indicating a change in a light source region between an input image and a viewpoint-converted image that is obtained by performing viewpoint conversion on the input image on the basis of a specified viewpoint, and causing a change in representation of light in the viewpoint-converted image on the basis of the calculated information indicating a change in the light source region.

(13)

A program for causing a computer to function as:
- a light source change calculation unit configured to calculate information indicating a change in a light source region between an input image and a viewpoint-converted image that is obtained by performing viewpoint conversion on the input image on the basis of a specified viewpoint; and a light representation control unit configured to cause a change in representation of light in the viewpoint-converted image, on the basis of the information indicating a change in the light source region and calculated by the light source change calculation unit.

REFERENCE SIGNS LIST

1 Image display system
11 Camera-equipped TV device
21 Imaging unit
22 Signal processing unit
23 Display unit
31 Viewpoint information generation unit
32 Image processing unit
51 Monocular depth estimation unit
52 Light source estimation unit
53 Viewpoint conversion unit
54 Light source change calculation unit
55 Light representation control unit
61 Control signal generation unit
62 Histogram conversion unit
71 Viewpoint conversion unit
72 Light representation conversion unit
101 Light Field Display device
111 Signal processing unit
112 Light Field Display
121 Control unit
122-1 to 122-N Image processing unit
131-1 to 131-N Display region

The invention claimed is:

1. An image processing apparatus, comprising:
a central processing unit (CPU) configured to:
estimate a first light source region in an input image;
generate input light source region information that indicates the estimated first light source region in the input image;
generate viewpoint conversion light source region information that indicates a second light source region in a viewpoint-converted image;
calculate, based on the input light source region information and the viewpoint conversion light source region information, information that indicates a change between the first light source region and the second light source region; and
change representation of light in the viewpoint-converted image based on the information that indicates the change between the first light source region and the second light source region.

2. The image processing apparatus according to claim 1, wherein the CPU is further configured to generate the viewpoint-converted image based on a specific viewpoint.

3. The image processing apparatus according to claim 1, wherein the CPU is further configured to:
calculate, based on the input light source region information and the viewpoint conversion light source region information, a light source area change feature amount that indicates a change between a first area of the first light source region and a second area of the second light source region; and
change the representation of light in the viewpoint-converted image based on the light source area change feature amount and the viewpoint conversion light source region information.

4. The image processing apparatus according to claim 3, wherein
the CPU is further configured to change, based on the change between the first area of the first light source region and the second area of the second light source region, a histogram of a specific region, and
the specific region is different from the second light source region of the viewpoint-converted image.

5. The image processing apparatus according to claim 1, wherein the CPU is further configured to:
generate, based on the input light source region information and the viewpoint conversion light source region information, a light source change image that indicates a change of shape between the first light source region and the second light source region; and
change the representation of light in the viewpoint-converted image based on the light source change image.

6. The image processing apparatus according to claim 5, wherein the CPU is further configured to change the representation of light in the viewpoint-converted image based on the light source change image.

7. The image processing apparatus according to claim 5, wherein the CPU is further configured to change, based on the light source change image, a light striation and a beam of light in the viewpoint-converted image.

8. The image processing apparatus according to claim 1, wherein
the CPU is further configured to generate the input light source region information based on a label on the input image, and
the label indicates the estimated first light source region.

9. The image processing apparatus according to claim 1, the CPU is further configured to:
estimate a depth of a pixel of the input image; and
generate the viewpoint-converted image and the viewpoint conversion light source region information based on the estimated depth.

10. The image processing apparatus according to claim 1, wherein the input image is a single image.

11. An image processing method, comprising:
in an image processing apparatus:
estimating a first light source region in an input image;
generating input light source region information indicating the estimated first light source region in the input image;
generating viewpoint conversion light source region information indicating a second light source region in a viewpoint-converted image;
calculating, based on the input light source region information and the viewpoint conversion light source region information, information indicating a change between the first light source region and the second light source region; and
changing representation of light in the viewpoint-converted image based on the information that indicates the change between the first light source region and the second light source region.

12. A non-transitory computer-readable medium having stored thereon, computer-executable instructions which, when executed by a computer, cause the computer to execute operations, the operations comprising:
estimate a first light source region in an input image;
generate input light source region information that indicates the estimated first light source region in the input image;

generate viewpoint conversion light source region information that indicates a second light source region in a viewpoint-converted image;
calculate, based on the input light source region information and the viewpoint conversion light source region information, information that indicates a change between the first light source region and the second light source region; and
change representation of light in the viewpoint-converted image based on the information that indicates the change between the first light source region and the second light source region.

\* \* \* \* \*